US010946358B2

(12) United States Patent
Zheng et al.

(10) Patent No.: US 10,946,358 B2
(45) Date of Patent: Mar. 16, 2021

(54) SKID-MOUNTED DEPRESSURIZING SYSTEM

(71) Applicants: BEIJING AEROSPACE PROPULSION INSTITUTE, Beijing (CN); BEIJING AEROSPACE PETROCHEMIACAL TECHNOLOGY & EQUIPMENT ENGINEERING CORPORATION LIMITED, Beijing (CN)

(72) Inventors: Xiaodong Zheng, Beijing (CN); Daxi Du, Beijing (CN); Jianqiang Wang, Beijing (CN); Zhiqiang Sun, Beijing (CN); Xu Han, Beijing (CN); Xueguang Hu, Beijing (CN); Xincheng Wang, Beijing (CN)

(73) Assignees: BEIJING AEROSPACE PROPULSION INSTITUTE, Beijing (CN); BEIJING AEROSPACE PETROCHEMICAL TECHNOLOGY & EQUIPMENT ENGINEERING CORPORATION LIMITED, Beijing (CN)

( * ) Notice: Subject to any disclaimer, the term of this patent is extended or adjusted under 35 U.S.C. 154(b) by 0 days.

(21) Appl. No.: 16/753,015

(22) PCT Filed: Jan. 28, 2019

(86) PCT No.: PCT/CN2019/073310
§ 371 (c)(1),
(2) Date: Apr. 2, 2020

(87) PCT Pub. No.: WO2020/034594
PCT Pub. Date: Feb. 20, 2020

(65) Prior Publication Data
US 2020/0230563 A1 Jul. 23, 2020

(30) Foreign Application Priority Data

Aug. 16, 2018 (CN) .......................... 2018 1 0935159
Aug. 16, 2018 (CN) .......................... 2018 1 0935184

(51) Int. Cl.
*G05D 23/19* (2006.01)
*B01J 19/00* (2006.01)
(Continued)

(52) U.S. Cl.
CPC ......... *B01J 19/002* (2013.01); *B01J 19/0013* (2013.01); *C10G 49/16* (2013.01);
(Continued)

(58) Field of Classification Search
CPC . B67D 7/04; E21B 36/00; E21B 17/18; E21B 33/068; E21B 36/006; E21B 43/2405
See application file for complete search history.

(56) References Cited

U.S. PATENT DOCUMENTS 4,104,873 A * 8/1978 Coffinberry ............... F02C 7/14
60/39.08
5,656,136 A * 8/1997 Gayaut ................. E21B 33/068
166/302
(Continued)

FOREIGN PATENT DOCUMENTS

| CN | 104449824 | 3/2015 |
| CN | 204251565 | 4/2015 |

(Continued)

OTHER PUBLICATIONS

International Search Report and Written Opinion for PCT/CN2019/073310 dated May 5, 2019, 11 pages.

*Primary Examiner* — Darrin D Dunn
(74) *Attorney, Agent, or Firm* — Dority & Manning, P.A.

(57) ABSTRACT

A skid-mounted depressurizing system includes a main process module, a mechanical control system, a thermody-
(Continued)

namic balance system and an intelligent control system. The main process module includes multiple main process pipelines, each of the multiple main process pipelines is provided with a pressure reducing valve set. During depressurization, process medium enters at least one of the multiple main process pipelines, the mechanical control system outputs a torque according to the control instruction of the intelligent control system to control each valve of the multiple main process pipelines to perform an action switch and an opening degree adjustment, the thermodynamic balance system is configured to provide the medium of different properties to the multiple main process pipelines according to the control instruction of the intelligent control system to control temperature, pressure, cleanliness degree and/or sealing degree of the main process module.

10 Claims, 7 Drawing Sheets

(51) Int. Cl.
  *C10G 49/16* (2006.01)
  *C10G 49/26* (2006.01)

(52) U.S. Cl.
  CPC .............. *C10G 49/26* (2013.01); *G05D 23/19* (2013.01); *B01J 2219/00058* (2013.01); *B01J 2219/00065* (2013.01); *B01J 2219/00162* (2013.01); *C10G 2300/4012* (2013.01)

(56) References Cited

U.S. PATENT DOCUMENTS

| | | | | |
|---|---|---|---|---|
| 6,026,839 | A * | 2/2000 | Kriebel | F17D 1/14 |
| | | | | 137/13 |
| 7,185,683 | B2 * | 3/2007 | Hillam | B67D 7/222 |
| | | | | 141/198 |
| 7,912,577 | B2 * | 3/2011 | Siler | G06Q 20/206 |
| | | | | 700/233 |
| 8,658,100 | B2 | 2/2014 | Biswas et al. | |
| 10,565,817 | B2 * | 2/2020 | Snodgrass | G06Q 20/145 |
| 2005/0213306 | A1 * | 9/2005 | Vos | H05K 7/20609 |
| | | | | 361/714 |
| 2006/0157142 | A1 * | 7/2006 | Hillam | B67D 7/3209 |
| | | | | 141/198 |
| 2006/0157147 | A1 * | 7/2006 | Hillam | B67D 7/085 |
| | | | | 141/198 |
| 2009/0149969 | A1 * | 6/2009 | Slupphaug | G05D 7/0635 |
| | | | | 700/42 |
| 2009/0159238 | A1 * | 6/2009 | Ko | F25D 3/02 |
| | | | | 165/46 |
| 2010/0101663 | A1 * | 4/2010 | Granborg | F16L 53/34 |
| | | | | 137/341 |
| 2010/0217443 | A1 * | 8/2010 | Hagler | F16K 5/0647 |
| | | | | 700/282 |
| 2011/0005757 | A1 * | 1/2011 | Hebert | E21B 43/24 |
| | | | | 166/302 |
| 2011/0039711 | A1 * | 2/2011 | Howell | B01L 7/52 |
| | | | | 506/7 |
| 2011/0166948 | A1 * | 7/2011 | Siler | G06Q 30/0185 |
| | | | | 705/18 |
| 2012/0167597 | A1 * | 7/2012 | Wilder | F25B 21/02 |
| | | | | 62/3.2 |
| 2015/0120474 | A1 * | 4/2015 | Webb | G06Q 20/145 |
| | | | | 705/18 |
| 2015/0120476 | A1 * | 4/2015 | Harrell | G07F 13/025 |
| | | | | 705/21 |
| 2015/0242969 | A1 * | 8/2015 | Pallas | G06Q 50/06 |
| | | | | 705/39 |
| 2015/0345275 | A1 * | 12/2015 | Sathananthan | E02B 17/04 |
| | | | | 210/737 |
| 2015/0362219 | A1 * | 12/2015 | Wehner | F24S 40/55 |
| | | | | 126/714 |
| 2016/0090288 | A1 * | 3/2016 | Givens, Jr. | B67D 1/0888 |
| | | | | 700/283 |
| 2016/0209086 | A1 * | 7/2016 | Kraus | F25B 25/00 |
| 2017/0131005 | A1 * | 5/2017 | Park | F25B 47/025 |
| 2017/0247241 | A1 * | 8/2017 | Blyth | B67D 7/04 |
| 2018/0016131 | A1 * | 1/2018 | Varini | G07F 13/025 |
| 2018/0042140 | A1 * | 2/2018 | Pan | H05K 7/2079 |
| 2018/0053178 | A1 * | 2/2018 | Shah | G06Q 20/20 |
| 2018/0058633 | A1 * | 3/2018 | Voelker | B01D 19/0036 |
| 2018/0094772 | A1 * | 4/2018 | Santos | F17C 13/00 |
| 2018/0187536 | A1 * | 7/2018 | Hefley | F24H 9/00 |
| 2019/0057365 | A1 * | 2/2019 | Harrell | G06Q 50/06 |
| 2019/0200489 | A1 * | 6/2019 | Martinez Garcia | |
| | | | | H05K 7/20781 |
| 2019/0373776 | A1 * | 12/2019 | Gao | H05K 7/20836 |
| 2020/0013039 | A1 * | 1/2020 | Snodgrass | G07F 17/0014 |
| 2020/0140255 | A1 * | 5/2020 | Fieglein | G06Q 20/209 |
| 2020/0166975 | A1 * | 5/2020 | Chainer | G06F 1/20 |

FOREIGN PATENT DOCUMENTS

| | | | |
|---|---|---|---|
| CN | 106016757 | A * | 10/2016 |
| CN | 106957675 | | 7/2017 |
| CN | 107664265 | A * | 2/2018 |
| CN | 207276557 | | 4/2018 |
| CN | 108913202 | | 11/2018 |
| CN | 109185702 | | 1/2019 |

* cited by examiner

SKID-MOUNTED DEPRESSURIZING SYSTEM

CROSS REFERENCE TO RELATED APPLICATIONS

The present application is the national phase of International Patent Application No. PCT/CN2019/073310, titled "SKID-MOUNTED DEPRESSURIZING SYSTEM", filed on Jan. 28, 2019, which claims the benefit of priorities to Chinese patent application No. 201810935184.9 titled "SKID-MOUNTED DEPRESSURIZING SYSTEM", filed with the China National Intellectual Property Administration on Aug. 16, 2018, and Chinese patent application No. 201810935159.0, titled "MAIN PROCESS MODULE OF SKID-MOUNTED DEPRESSURIZING SYSTEM", filed with the China National Intellectual Property Administration on Aug. 16, 2018, the entire disclosures of which are incorporated herein by reference in their entireties.

FIELD

The present application relates to the technical field of coal chemical industry and petrochemical industry equipment, in particular to a skid-mounted depressurizing system.

BACKGROUND

In recent years, crude oil products are getting worse, while the market requirements for light and clean fuel oil have been increasing. Therefore, while continuously promoting the transformation and upgrade of the refining industry and upgrading the quality of refined oil products, some countries have vigorously promoted the clean and efficient use of coal to promote the research and development of coal-to-gas and coal-to-liquid technologies. A high-efficiency energy development process such as direct coal-to-liquid production, coal-liquid mixing refine, coal tar hydrocracking and residue/heavy oil hydrocracking with a non-fixed bed (such as suspended bed and boiling bed) hydrogenation reactor as a core device is drawing more and more attention.

In the above four hydrogenation processes, except for the process of the direct coal-to-liquid production that is affected by the continued downturn in international crude oil price, the other three process routes are upgrading of the "waste oil" or heavy oil and fully extract the residual value of raw materials, to maximize the marginal benefits of the refining and coking industries. Regardless of the process, the process medium after being hydrogenated in the hydrogenation reactor must be depressurized by a depressurizing system for product separation.

The suspended bed hydrocracking uses a process of "suspended bed plus fixed bed". In the suspended bed hydrogenation part thereof, the raw materials, additives and hydrogen are mixed, heated and pressurized, then enter a suspended bed reactor. Since no catalyst is used, it's the thermal cracking reactions under high hydrogen partial pressure that take place mainly at this procedure. During the reaction, residual carbon, asphaltenes and metals in the raw materials are all adsorbed and cracked on the additives. The heavy metal and the generated small amount of coke are finally deposited on the additives. The additives and the unconverted heavy components are deposited at a bottom of a hot high pressure separator, enter into a low pressure separator through a depressurizing system, and are subjected to a flash separation again. The separated solid-containing slurry enters into a depressurizing tower for fractionation again, and finally, the solid-containing residue at a bottom of the depressurizing tower enters a molding system for solidification to form solid oil residue.

The raw materials processed by the boiling bed hydrogenation process are also a mixture of heavy oil and additives or pulverized coal. The boiling bed reaction product is required to be subjected to gas-liquid-solid separation by the hot high-pressure separator, and the slurry formed from solid and heavy liquid phase components enters a medium pressure separator or a low pressure separator through the bottom of the hot high-pressure separator for another separation. Therefore, a perfect and stable depressurizing system is also required to send the solid-containing slurry with high temperature and high pressure differential to the low pressure separator.

However, for the depressurizing system at the bottom of the hot high-pressure separator of the suspended bed or the boiling bed hydrogenation device currently under construction or already in operation, since the feed of the suspended bed or the boiling bed is a mixture of heavy oil (such as coal tar, atmospheric residue, vacuum residue, catalytic oil slurry and fuel oil) and additives, or a mixture of heavy oil and pulverized coal (oil coal slurry), the pressure reducing valve set of the system for the mixture from the hot high pressure separator to the hot low pressure separator is operated under a condition of high temperature, high pressure difference, high solid content, and is easily damaged by erosion and abrasion. The pressure reducing valve set has wearing problems of different degrees, and it is necessary to carry out switching maintenance in the shortest several hours or the longest months. The operation is difficult, the maintenance cost is high, the safety hazard is large, and the smooth operation is difficult.

SUMMARY

The technical problem to be solved according to the present application is to provide a skid-mounted depressurizing system, through the design of which the thermal stress during the use of the device and the risk of valve-cracking and valve-sticking can be reduced, and the operating cycle service life of the process device can be prolonged.

In order to achieve this object, the following technical solution according to the present application is provided.

A skid-mounted depressurizing system is provided, which includes a main process module, a mechanical control system 9, a thermodynamic balance system 10 and an intelligent control system, where the main process module includes multiple main process pipelines, each of the multiple main process pipelines is provided with a pressure reducing valve set; and during depressurization, a process medium enters at least one of the multiple main process pipelines, the intelligent control system sends control instructions to the mechanical control system 9 and the thermodynamic balance system 10, the mechanical control system 9 outputs a torque according to the control instruction of the intelligent control system to control the opening and closing and the opening degree adjustment of each valve of the multiple main process pipelines, and the thermodynamic balance system 10 provides the medium having different properties to the multiple the main process pipelines according to the control instruction of the intelligent control system to control temperature, pressure, cleanliness degree and/or sealing degree of the main process module.

In an alternative embodiment, the main process module includes N main process pipelines, where N≥4, and the N main process pipelines have a same function and are backup pipelines for each other.

In an alternative embodiment, the N main process pipelines are located between an inlet and an outlet of the depressurizing system, and are uniformly distributed in a circumferential direction or are symmetrically distributed with a line connecting the inlet and the outlet of the depressurizing system as a center line.

In an alternative embodiment, in the skid-mounted depressurizing system, inlets of the multiple main process pipelines are connected together by one pipe, and outlets thereof are connected by another pipe; or the inlets of the multiple main process pipelines are connected by a multi-way switching valve, and the outlets thereof are connected by another multi-way switching valve.

In an alternative embodiment, each of the multiple main process pipelines includes an upstream first shutoff valve 2, a connecting pipeline II32, an upstream second shutoff valve 3, a connecting pipeline III33, a depressurization regulating valve 4, a connecting pipeline IV34, a downstream second shutoff valve 5, a connecting pipeline V35 and a downstream first shutoff valve, which are connected in sequence.

In an alternative embodiment, the mechanical control system 9 is respectively connected to the upstream first shutoff valve 2, the upstream second shutoff valve 3, the depressurization regulating valve 4, the downstream second shutoff valve 5, and the downstream first shutoff valve 7 in each of the multiple main process pipelines.

In an alternative embodiment, the thermodynamic balance system 10 is connected to the multiple main process pipelines at the connecting pipeline II32, the connecting pipeline III33, the connecting pipeline IV34, and the connecting pipeline V35, respectively, and each of the connecting pipelines includes more than one connecting port, and each connecting port is an outlet or an inlet for the medium of different properties.

In an alternative embodiment, the inlets of the N main process pipelines are connected by a multi-way switching valve I, and the outlets thereof are connected by a multi-way switching valve II and are circumferentially distributed;

the multi-way switching valve I includes an inlet pipe and multiple outlet pipes located below the inlet pipe and circumferentially distributed, a switching valve element I for controlling the opening and closing of the multi-way switching valve is mounted on a side of each outlet pipe of the multi-way switching valve I, and a top end of the inlet pipe of the multi-way switching valve I is an inlet for the medium;

the multi-way switching valve II includes an outlet pipe and multiple inlet pipes located above the outlet pipe and circumferentially distributed, and a switching valve element II for controlling opening and closing is mounted on a side of each of the multiple inlet pipes of the multi-way switching valve II, and a bottom end of each outlet pipe of the multi-way switching valve I is respectively connected to a top end of the corresponding inlet pipe of the multi-way switching valve II through one of the main process pipelines; and the medium enters from the inlet pipe of the multi-way switching valve I, then selectively flows into one or more of the N main process pipelines according to the opening and closing of the switching valve element I, then is converged at the outlet pipe of the multi-way switching valve II by the switching valve element II after depressurization, and finally flows out.

In an alternative embodiment, the multi-way switching valve I is at least one of a three-way valve, a four-way valve, a five-way valve, a six-way valve, a seven-way valve, and an eight-way valve; and the number of the outlet pipes of the multi-way switching valve I is equal to the number of the inlet pipes of the multi-way switching valve II.

In an alternative embodiment, the pressure reducing valve set includes a depressurization regulating valve, a shutoff valve ahead of the depressurization regulating valve, and a shutoff valve behind the depressurization regulating valve, which are sequentially arranged. Each of the outlet pipes of the multi-way switching valve I and an inlet of the shutoff valve ahead of the depressurization regulating valve are connected by one connecting pipeline. So do an outlet of the shutoff valve ahead of the depressurization regulating valve and an inlet of the depressurization regulating valve, an outlet of the depressurization regulating valve and an inlet of the shutoff valve behind the depressurization regulating valve, and an outlet of the shutoff valve behind the depressurization regulating valve and each of the inlet pipes of the multi-way switching valve II.

In an alternative embodiment, the shutoff valve ahead of the depressurization regulating valve is an angle stop valve, the shutoff valve behind the depressurization regulating valve is a ball valve, the angle stop valve and the ball valve are both horizontally mounted, and the depressurization regulating valve is vertically mounted; and each of the outlet pipes of the multi-way switching valve I is connected with a side inlet of the angle stop valve through an L-shaped connecting pipeline I vertically provided, a rear end outlet of the angle stop valve is connected with a side inlet of the depressurization regulating valve through a horizontal tubular connecting pipeline II horizontally provided, a bottom end outlet of the depressurization regulating valve is connected with a front end inlet of the ball valve through an L-shaped connecting pipeline III vertically provided, and a rear end outlet of the ball valve is connected with each of the inlet pipes of the multi-way switching valve II through an L-shaped connecting pipeline IV vertically provided.

In an alternative embodiment, the shutoff valve ahead of the depressurization regulating valve is an angle stop valve, the shutoff valve behind the depressurization regulating valve is a ball valve, and the angle stop valve, the depressurization regulating valve, the ball valve are all horizontally mounted; and each of the outlet pipes of the multi-way switching valve I is connected with a side inlet of the angle stop valve through an L-shaped connecting pipeline I vertically provided, a rear end outlet of the angle stop valve is connected with a side inlet of the depressurization regulating valve through an L-shaped connecting pipeline II vertically provided, a rear end outlet of the depressurization regulating valve is connected with a front end inlet of the ball valve through a horizontal tubular connecting pipeline III horizontally provided, and a rear end outlet of the ball valve is connected with each of the inlet pipes of the multi-way switching valve II through an L-shaped connecting pipeline IV vertically provided.

In an alternative embodiment, the shutoff valve ahead of the depressurization regulating valve is an angle stop valve, the shutoff valve behind the depressurization regulating valve is a ball valve, and the angle stop valve, the depressurization regulating valve, the ball valve are all horizontally mounted; and each of the outlet pipes of the multi-way switching valve I is connected with a side inlet of the angle stop valve through an L-shaped connecting pipeline I vertically provided, a rear end outlet of the angle stop valve is connected with a side inlet of the depressurization regulating valve through an L-shaped connecting pipeline II vertically provided, a rear end outlet of the depressurization regulating valve is connected with a front end inlet of the ball valve through an L-shaped connecting pipeline III horizontally provided, and a rear end outlet of the ball valve is connected with each of the inlet pipes of the multi-way switching valve II through an L-shaped connecting pipeline IV vertically provided. In an alternative embodiment, the thermodynamic balance system includes a storage unit, a switching unit, a heating unit, a cooling unit, and a conveying unit, where the storage unit is configured to store the medium, the heating unit is configured to heat the input medium, and the cooling unit is configured to cool the input medium, and in operation, the conveying unit is configured to increase the pressure of the medium flowing out from the storage unit and convey the medium downstream, and the switching unit is configured to convey the medium conveyed by the conveyed unit to the heating unit and/or the cooling unit to output the medium after the medium reaches a target property.

In an alternative embodiment, the switching unit includes a cooling pipeline and a heating pipeline connected in parallel, and the cooling unit is provided on the cooling pipeline, the heating unit is provided on the heating pipeline, one end of the switching unit is connected to the conveying unit, and another end is an output port.

In an alternative embodiment, the cooling pipeline is provided with a valve I15 and a valve IV20 respectively located on two sides of the cooling unit, the heating pipeline is provided with a valve II17 and a valve III19 respectively located on two sides of the heating unit, a first end of the cooling pipeline and a first end of the heating pipeline are connected to the conveying unit through a first connecting pipeline, the first connecting pipeline is provided with a minimum return valve 14, a second end of the cooling pipeline is connected with a second end of the heating pipeline through a second connecting pipeline, and the a valve V21 is provided on the second connecting pipeline.

In an alternative embodiment, the mechanical control system 9 includes at least one of an electric control system, a pneumatic control system, or an electro-hydraulic control system.

In an alternative embodiment, the electric control system includes an electric actuator and an electric control unit for controlling the electric actuator, and the electric control unit is a local electric control unit or a remote electric control unit;

the pneumatic control system includes a pneumatic actuator, an emergency unit, a gas supply system and a pneumatic control unit, where the pneumatic actuator is a pneumatic diaphragm or a cylinder actuator, the emergency unit is an emergency airbag or an emergency gas cylinder, and the pneumatic control unit is a local pneumatic control unit or a remote pneumatic control unit; and the electro-hydraulic control system includes an electro-hydraulic actuator, an oil supply system and an electro-hydraulic control unit, where the electro-hydraulic control unit is a local electro-hydraulic control unit or a remote electro-hydraulic control unit.

In an alternative embodiment, the intelligent control system includes a central control module, a depressurizing-system external signal processing module, a mechanical-control-system processing module, and a thermodynamic-balance-system processing module;

the depressurizing-system external signal processing module is configured to receive and process signals of upstream and downstream devices or other signals external to the depressurizing system, and transmit the signals to the central control module for corresponding processing;

the mechanical-control-system processing module is configured to receive an instruction sent by the central control module, and to feedback and control each valve in the main process module to implement actions; and the thermodynamic-balance-system processing module is configured to receive the instruction sent by the central control module, and to feedback and control actions of each functional unit in the thermodynamic balance system.

In an alternative embodiment, the different properties refer to different pressure, different temperature and/or different kinds.

The beneficial effects of the present application are as follows:

1. For a multi-phase flow process medium with high-temperature and high-pressure, a complete set of stable and reliable long-cycle operation solutions is provided according to the present application;

2. The thermodynamic balance solution according to the present application can effectively reduce the thermal stress during the use of the device, and reduce the risk of valve-cracking and valve-sticking in the main process module;

3. The design solution of the depressurizing system according to the present application has high automation degree, strong safety and reliability, and is easy to maintain; and 4. The skid-mounted and modular design solution according to the present application facilitates the installation and debugging of the entire system, and can achieve quality assurance with high reliability before leaving the factory.

BRIEF DESCRIPTION OF THE DRAWINGS

FIG. 4-1 is a schematic view showing the structure of a main process module including four main pipelines in a symmetric distributed mounting;

FIG. 4-2 is a schematic view showing the structure of a main process module including four main pipelines in a circumferentially distributed mounting;

FIG. 4-3 is a schematic view showing the structure of a second embodiment;

FIG. 4-4 is a schematic view showing the structure of a third embodiment;

REFERENCE NUMERALS

| | |
|---|---|
| A main process module; | B mechanical control system; |
| C thermodynamic balance system; | D intelligent control system; |
| 1 inlet of main process module; | 2 upstream first shutoff valve; |
| 3 upstream second shutoff valve; | 4 depressurization regulating valve; |
| 5 downstream second shutoff valve; | 6 valve flushing pipeline; |
| 7 downstream first shutoff valve; | 8 outlet of main process module; |
| 9 mechanical control system; | 10 thermodynamic balance system; |
| 11 inlet for thermodynamic balance medium; | 12 storage tank; |
| 13 pump set; | 14 minimum return valve; |
| 15 valve I; | 16 cooler; |
| 17 valve II; | 18 heater; |
| 19 valve III; | 20 valve IV; |
| 21 valve V; | 22 medium outlet of thermodynamic balance; |
| 31 connecting pipeline I; | 32 connecting pipeline II; |
| 33 connecting pipeline III; | 34 connecting pipeline IV; |
| 35 connecting pipeline V; | 36 connecting pipeline VI. |

DETAILED DESCRIPTION OF THE EMBODIMENTS

The technical solutions according to the present application are described in detail in conjunction with drawings and specific embodiments.

Figure 1:
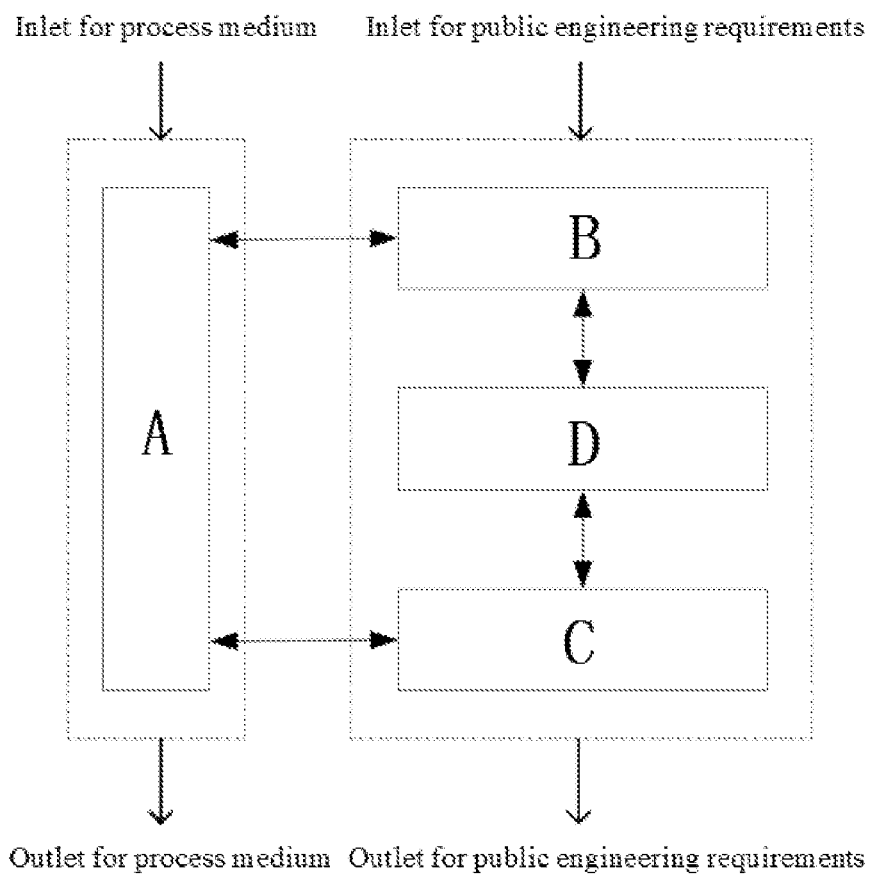
FIG. 1 is a schematic view of a functional unit of a skid-mounted depressurizing system.

A skid-mounted depressurizing system is provided according to the present application, which is applied to coal chemical industry equipment and petrochemical industry equipment. The depressurizing system includes a main process module, a mechanical control system, a thermodynamic balance system and an intelligent control system. As shown in FIG. 1, the process medium enters the main process module in the depressurizing system of the present application, and according to an instruction of the intelligent control system, the mechanical control system outputs a torque to control the opening and closing and the opening degree adjustment of each valve, the process medium is thereby depressurized, and then the process medium flows out of the depressurizing system. Meanwhile, the public engineering requirements including oil, gas, steam, water and electricity enter the mechanical control system, the intelligent control system, the thermodynamic balance system to ensure the normal operation of the depressurizing system itself.

1. The main process module is composed of multiple main process pipelines, and each of the main process pipelines includes a pressure reducing valve set which has a depressurization regulating valve as a core, a front shutoff valve and a rear shutoff valve as an auxiliary or a switching valve as an auxiliary; and each valve in the pressure reducing valve set includes an automatic valve, and further includes a manual valve as needed.

2. The mechanical control system is the actuator of the automatic valve and the control system thereof in the main process pipelines;

the mechanical control system includes at least one of an electric control system, a pneumatic control system, and an electro-hydraulic control system; and the mechanical control system is operated according to the instructions of the intelligent control system, and is configured to provide, under the power of a power source, the torque required for actions of each automatic valve, and is configured to transmit the torque to a body structure of each automatic valve through a valve stem, to control the opening and closing of each automatic valve and the opening degree thereof.

3. The thermodynamic balance system is configured to provide the medium of different temperatures, pressures and kinds to the main process module of the depressurizing system according to the instructions of the intelligent control system, to achieve functions of, for example, temperature control, pressure control, cleaning, and seal detection inside the depressurizing system; and the thermodynamic balance system includes a storage unit, a switching unit, a heating unit, a cooling unit, and a conveying unit.

4. Intelligent control system

The intelligent control system includes a central control module, a depressurizing-system external signal processing module, a mechanical-control-system processing module, and a thermodynamic-balance-system processing module;

the intelligent control system is configured to transmit, record and process internal and external signals of the depressurizing system; the internal and external signals of the depressurizing system include signals of the valve action sequence and emergency response, the upstream and downstream liquid level detection of the depressurizing system, and the start and stop of the heating and cooling equipment;

the depressurizing-system external signal processing module is configured to receive and process signals of upstream and downstream devices or other signals external to the depressurizing system, and transmit the signals to the central control module for corresponding processing;

the mechanical-control-system processing module is configured to receive an instruction sent by the central control module, and to feedback and control each valve in the main process module to implement actions; and the thermodynamic-balance-system processing module is configured to receive the instruction sent by the central control module, and to feedback and control actions of each functional unit in the thermodynamic balance system.

The main process module includes N main process pipelines, where N≥4; and the N main process pipelines have a same function and are backup pipelines for each other.

One of the following operating states is achieved via the depressurizing system:

a state in which one main process pipeline is in operation and the N−1 main process pipelines are backup; and a state in which two or more main process pipelines are in operation and the rest main process pipelines are backup.

Figure 2:
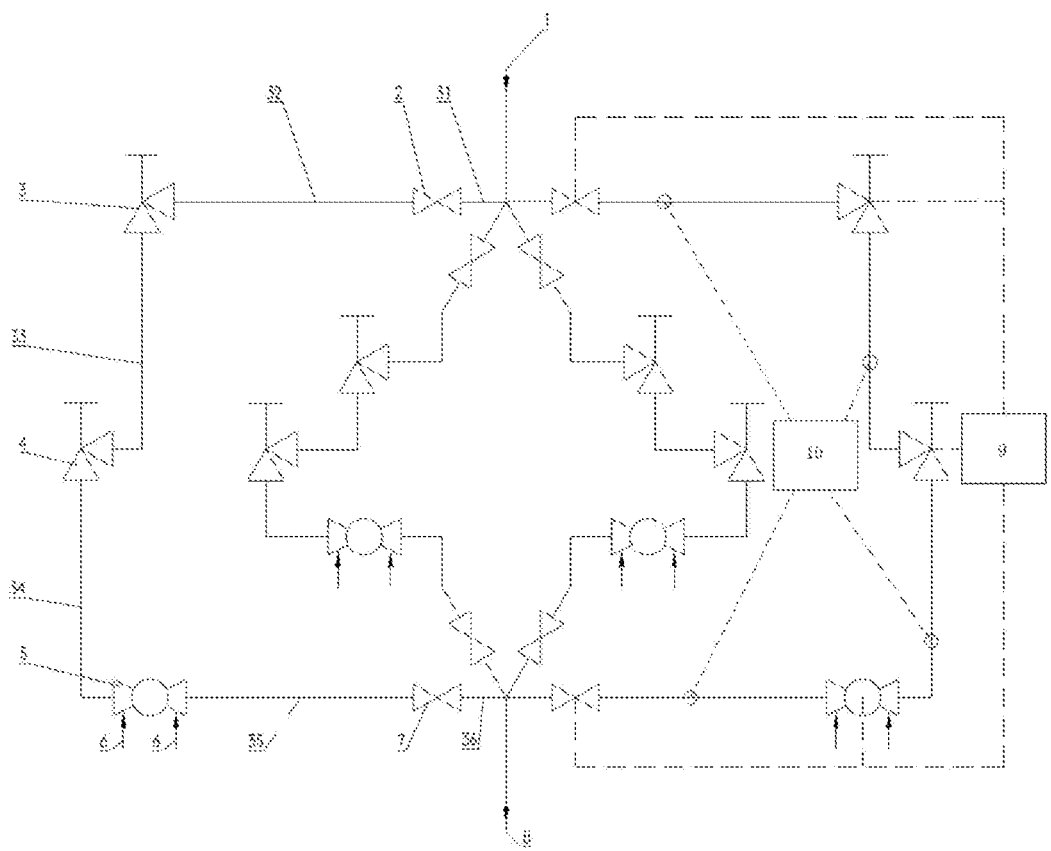
FIG. 2 is a schematic view of an embodiment of the skid-mounted depressurizing system.

Specifically, in the present embodiment, as shown in FIG. 2, the main process module of the depressurizing system is provided with four main process pipelines including a pressure reducing valve set, and each pipeline is completely the same. Such arrangement can achieve the state in which one main process pipeline is in operation and the N−1 main process pipelines are backup, or the state in which two or more main process pipelines are in operation and the rest main process pipelines are backup, or other states.

The connection method of the N main process pipelines is one of the following ways: the inlets and outlets of the main process pipelines are respectively connected together by pipelines; and, the N main process pipelines are connected by a multi-way switching valve.

In a case that the inlets and outlets of the main process pipelines are connected together by pipelines, each of the main process pipelines is identical, and includes a connecting pipeline I31, an upstream first shutoff valve 2, a connecting pipeline II32, an upstream second shutoff valve 3, a connecting pipeline III33, a depressurization regulating valve 4, a connecting pipeline IV34, a downstream second shutoff valve 5, a connecting pipeline V35, a downstream first shutoff valve 7, and a connecting pipeline VI36 in sequence.

In a case that the inlets and outlets of the main process pipelines are connected by the multi-way switching valve, each of the main process pipelines is identical, and includes the upstream first shutoff valve 2, the connecting pipeline II32, the upstream second shutoff valve 3, the connecting pipeline III33, the depressurization regulating valve 4, the connecting pipeline IV34, the downstream second shutoff valve 5, the connecting pipeline V35, and the downstream first shutoff valve 7 in sequence.

In FIG. 2, taking a rightmost way as an example, the mechanical control system 9 is respectively connected to the upstream first shutoff valve 2, the upstream second shutoff valve 3, the depressurization regulating valve 4, the downstream second shutoff valve 5, and the downstream first shutoff valve 7. The mechanical control system provides the torque required for actions of each automatic valve, and is operated according to instructions of the intelligent control system to control the opening and closing of each valve.

The electric control system in the mechanical control system includes an electric actuator and an electric control unit for controlling the electric actuator, and the electric control unit is a local electric control unit or a remote electric control unit.

The pneumatic control system in the mechanical control system includes a pneumatic actuator, an emergency unit, a gas supply system and a pneumatic control unit, where the pneumatic actuator is a pneumatic diaphragm or a cylinder actuator, the emergency unit is an emergency airbag or an emergency gas cylinder, and the pneumatic control unit is a local pneumatic control unit or a remote pneumatic control unit.

The electro-hydraulic control system in the mechanical control system includes an electro-hydraulic actuator, an oil supply system and an electro-hydraulic control unit, where the electro-hydraulic control unit is a local electro-hydraulic control unit or a remote electro-hydraulic control unit.

The internal maintenance process of the depressurizing system includes a combination of the functions such as the switching of the main process pipelines, online leak detection, online maintenance, flushing, heating, cooling, and online hot standby, which is completed under the cooperation of the main process pipelines, the mechanical control system, the thermodynamic balance system and the intelligent control system.

The already set internal maintenance process of the depressurizing system determines injection and discharge positions of a functional medium of the thermodynamic balance system in the main process pipelines, and determines the action timing of the corresponding valve.

The thermodynamic balance system 10 is connected to the multiple main process pipelines at the connecting pipeline II32, the connecting pipeline III33, the connecting pipeline IV34, and the connecting pipeline V35, respectively, and each of the connecting pipelines includes more than one connecting port, and each connecting port is an outlet or an inlet for the thermodynamic balance medium.

Figure 3:
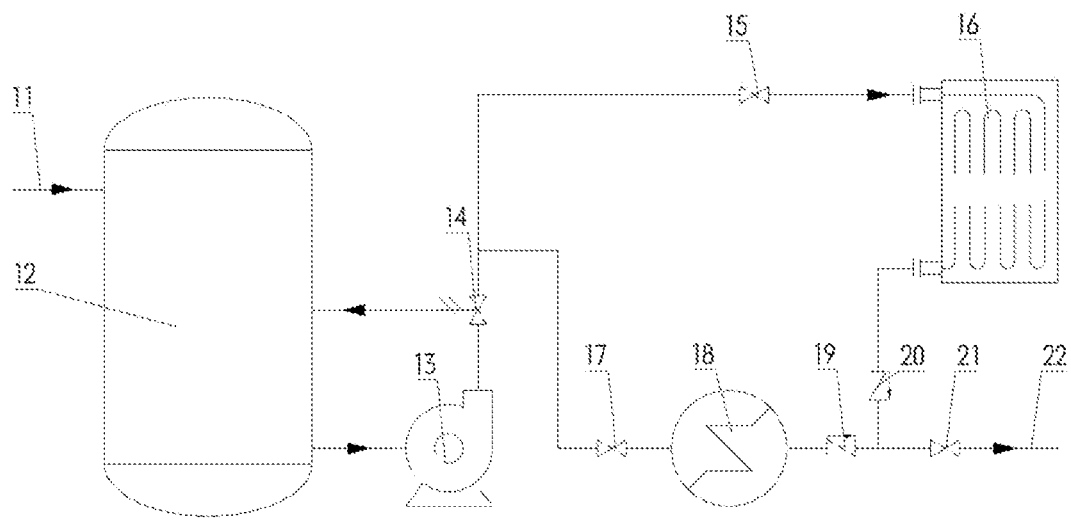
FIG. 3 is a schematic view of an embodiment of a thermodynamic balance system of the skid-mounted depressurizing system.

As shown in FIG. 3, the storage unit is a storage tank 12, the heating unit is a heater 18, the cooling unit is a cooler 16, the switching unit is a valve set including a minimum return valve 14, a valve I15, a valve II17, a valve III19, a valve IV20, and a valve V21, and the conveying unit is a conveying pump set 13. The storage tank 12 is configured to store and buffer the medium of different temperatures, pressures and kinds; the medium is conveyed to the downstream after being pressurized by the conveying pump set 13, and is conveyed to the downstream or returned to the storage tank 12 at the minimum return valve 14 according to the required flow rate of the main process pipelines; when the oil temperature in the storage tank 12 is too low, the medium is selected to flow through the valve II17 and be heated to a certain temperature by the heater 18, flows through the valve III19 and the valve V21, and is finally supplied to the main process pipelines; and when the oil temperature in the storage tank 12 is too high, the medium is selected to pass through the valve I15 and be cooled to a certain temperature by the cooler 16, flows through the valve IV20 and the valve V21, and is finally supplied to the main process pipelines.

The above functional units can achieve corresponding functions under the instructions of the intelligent control system.

In the intelligent control system, the control method of the control device is at least one of local control and remote control.

First Embodiment

As shown in FIG. 1, a main process module of a depressurizing system including four main process pipelines is provided.

Figures 1, 4:
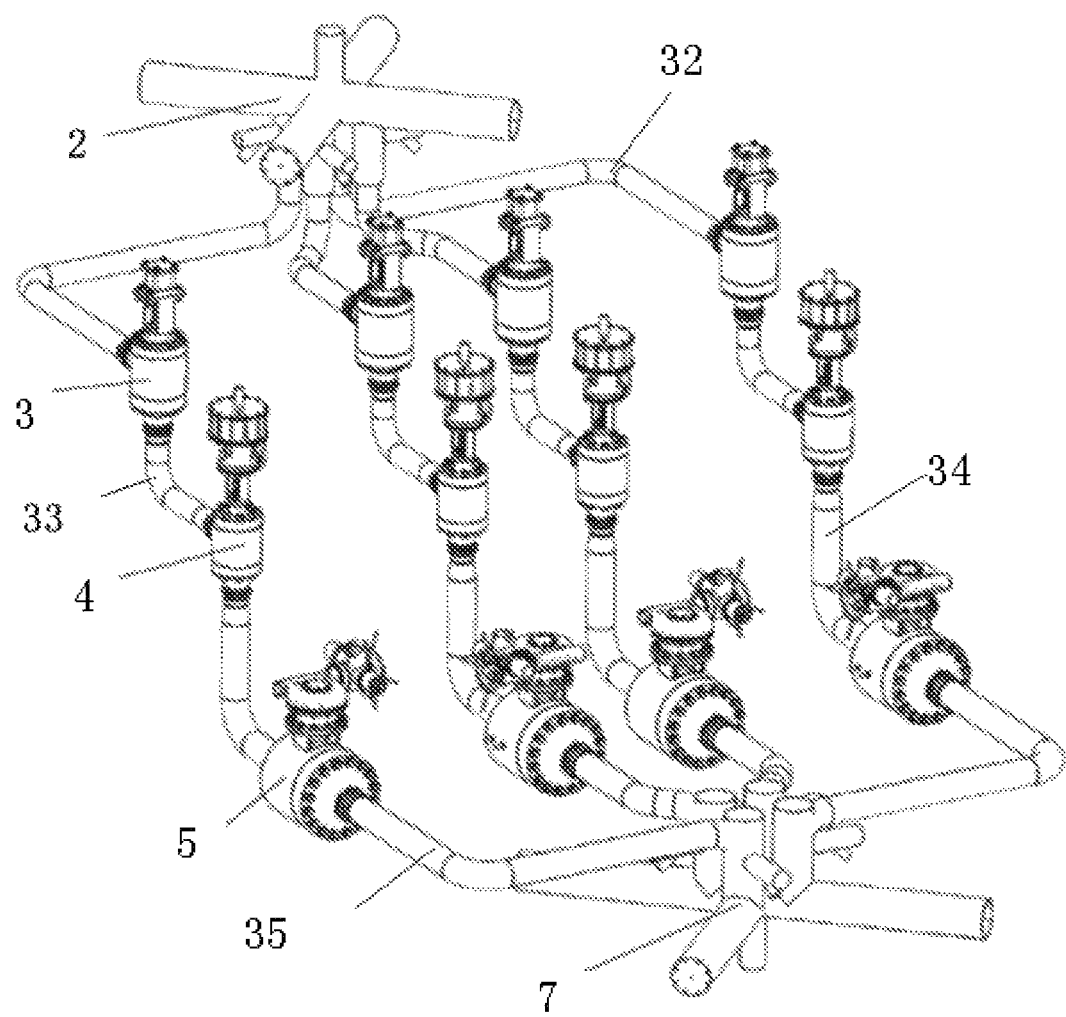
Figures 2, 4:
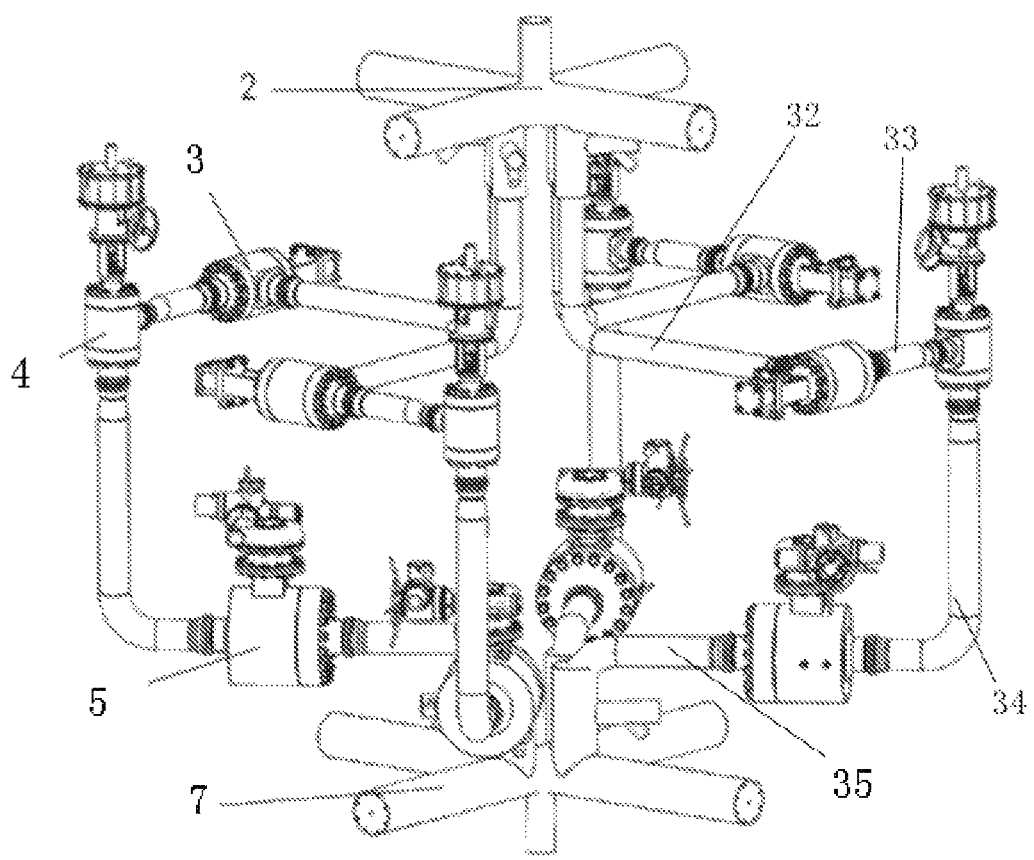
Figures 3, 4:
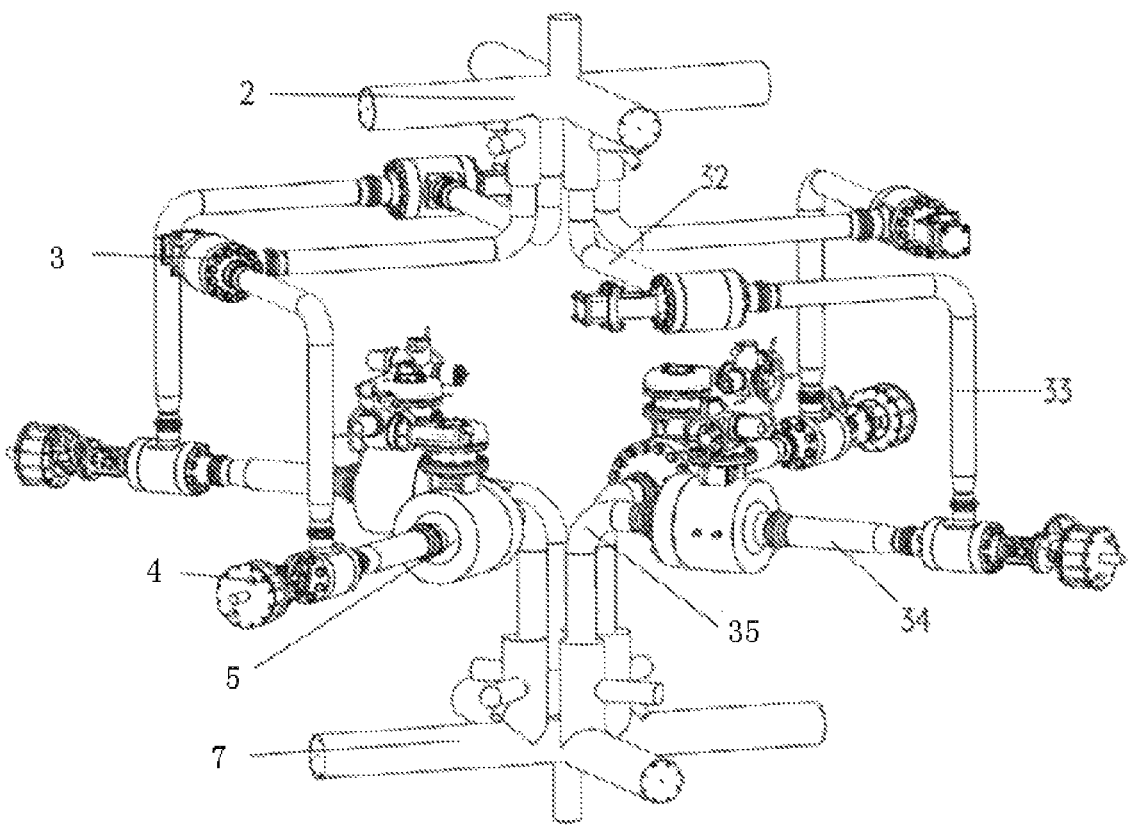
Figure 4:
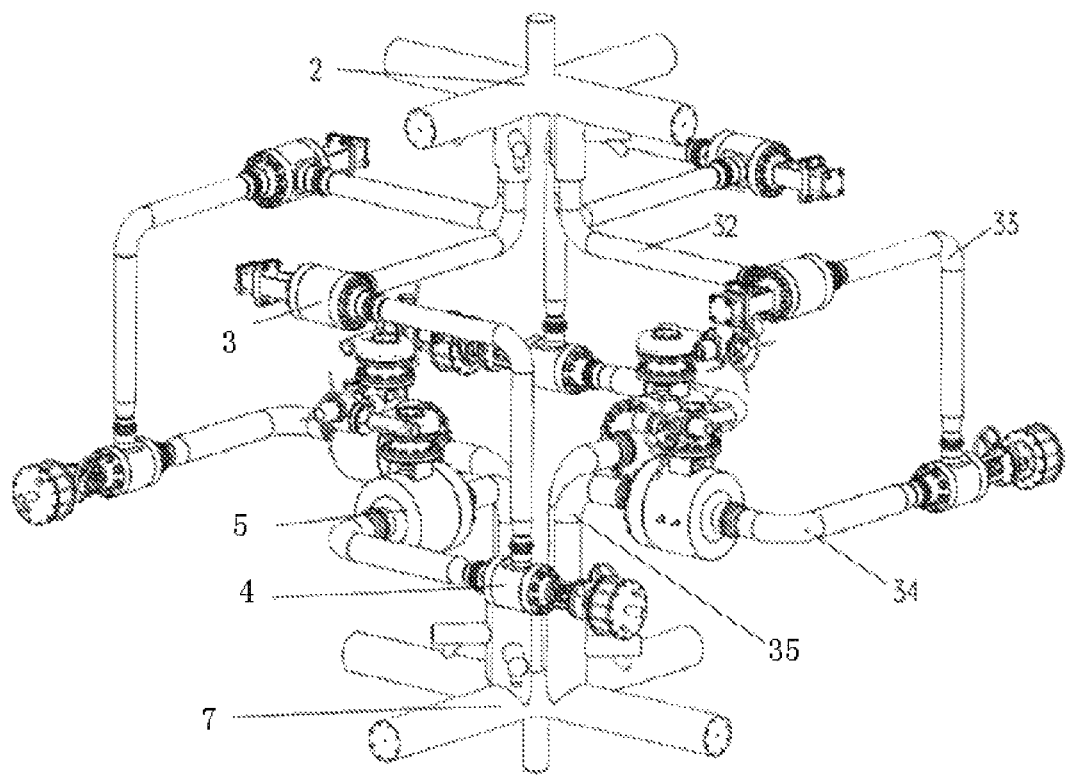
Figure 5:
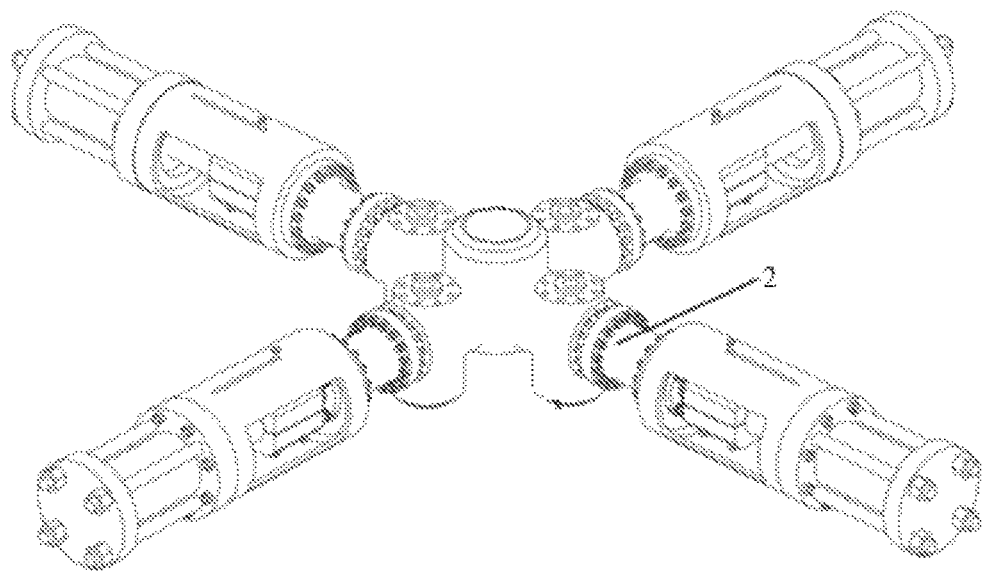
FIG. 5 is an enlarged schematic view of the multi-way switching valve I.

As shown in FIGS. 4-1 and 5, the regulating valve sets of the main process pipelines are symmetrically distributed in a staircase shape, and the specific design solution thereof is as follows.

A multi-way switching valve I is provided, which is a five-way valve. The multi-way switching valve I includes an inlet pipe and four outlet pipes located below the inlet pipe and symmetrically distributed, a switching valve element I (the upstream first shutoff valve 2) for controlling the opening and closing of the multi-way switching valve is mounted on a side of each outlet pipe of the multi-way switching valve I, the four switching valve elements I are respectively used for switching of the four valve sets, and a top end of the inlet pipe of the multi-way switching valve I is an inlet 1 (an inlet for the high temperature and high pressure medium) of main process module.

Figure 6:
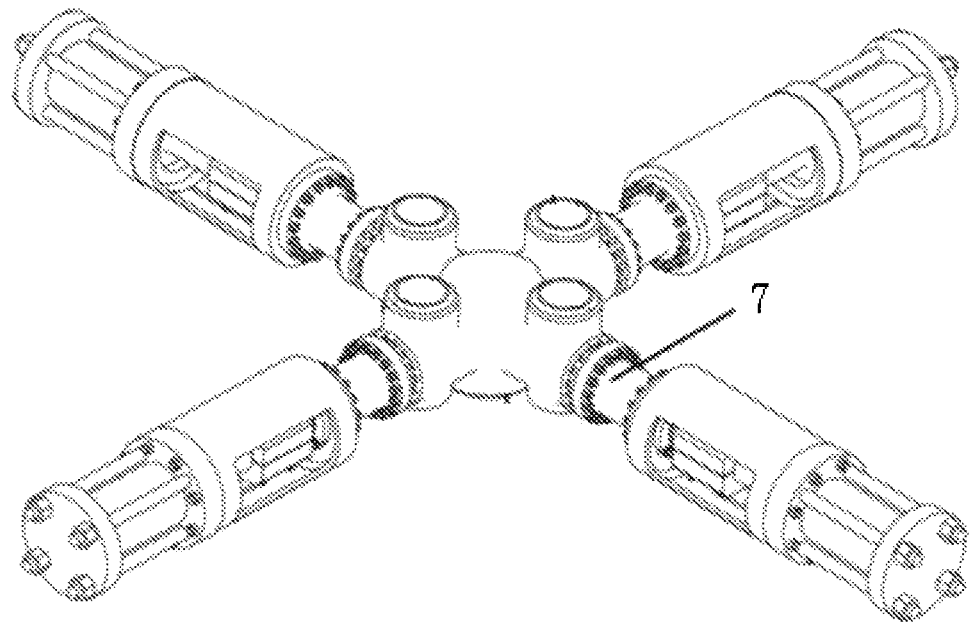
FIG. 6 is an enlarged schematic view of the multi-way switching valve II.

As shown in FIGS. 4-1 and 6, a multi-way switching valve II is provided, which is a five-way valve. The multi-way switching valve II includes an outlet pipe and four inlet pipes located above the outlet pipe and circumferentially distributed, and a switching valve element II (the down first shutoff valve 7) for controlling opening and closing of the multi-way switching valve II is mounted on a side of each of the inlet pipes of the multi-way switching valve II, and the four switching valve elements II are respectively used for switching of the four valve sets, and a lower end of the outlet pipe of the multi-way switching valve II is an outlet 8 of main process module.

A bottom end of each outlet pipe of the multi-way switching valve I is respectively connected to a top end of the corresponding inlet pipe 4 of the multi-way switching valve II through one regulating valve set. The four regulating valve sets are identical, and each of the regulating valve sets includes the upstream second shutoff valve 3 (angle stop valve), the depressurization regulating valve 4, and the downstream second shutoff valve 5 (ball valve) which are sequentially arranged. Each of the outlet pipes of the multi-way switching valve I and an inlet of the angle stop valve are connected by one connecting pipeline. So do an outlet of the angle stop valve and an inlet of the depressurization regulating valve 4, an outlet of the depressurization regulating valve 4 and an inlet of the ball valve, and an outlet of the ball valve and each of the inlet pipes of the multi-way switching valve II.

The integrated depressurizing system mounted in a circumferentially distributed manner further includes the mechanical control system and the intelligent control system, where the mechanical control system for controlling the opening and closing of each valve is provided at each valve, and the intelligent control system is configured to control the operation of the mechanical control system.

The vertical plane formed between the inlet pipe of the multi-way switching valve I and the corresponding outlet pipe of the multi-way switching valve II is taken as a symmetrical plane, and the four regulating valve sets are symmetrically distributed in pairs. The angle stop valve and the depressurization regulating valve are vertically mounted, the ball valve is horizontally mounted, and the angle stop valve, the depressurization regulating valve and the ball valve of a same regulating valve set are located on a same vertical plane. Each of the outlet pipes of the multi-way switching valve I is connected with a side inlet of the angle stop valve through an L-shaped connecting pipeline II32 horizontally provided, a bottom end outlet of the angle stop valve is connected with a side inlet of the depressurization regulating valve 4 through an L-shaped connecting pipeline III33 vertically provided, a bottom end outlet of the depressurization regulating valve 4 is connected with a rear end inlet of the ball valve connected an L-shaped connecting pipeline IV34 vertically provided, and a front end outlet of the ball valve is connected with each of the inlet pipes of the multi-way switching valve II through an L-shaped connecting pipeline V35 horizontally provided. Moreover, the angle stop valves, the depressurization regulating valves 4 and the ball valves of the regulating valve sets are respectively mounted on different horizontal planes (that is, each valve set forms three horizontal planes).

The depressurizing system according to the present embodiment can meet the pressure-regulation requirements under high temperature and high pressure differential working conditions, can reduce the thermal stress during the use of the device, and can reduce the risk of valve-cracking and valve-sticking to some extent.

Second Embodiment

Different from the first embodiment, as shown in FIG. 4-2 (in the following description, a position close to the multi-way switching valve I is defined as the front, a position close to the multi-way switching valve II is defined as the rear, an upper position is defined as the top, and a lower position is defined as the bottom), the specific design of the depressurizing system mounted in a circumferentially distributed manner is as follows.

A multi-way switching valve I is provided, which is a five-way valve. The multi-way switching valve I includes an inlet pipe and four outlet pipes located below the inlet pipe and circumferentially distributed, a switching valve element I for controlling the opening and closing of the multi-way switching valve is mounted on a side of each outlet pipe of the multi-way switching valve I, the four switching valve elements I are respectively used for switching of the four valve sets, and a top end of the inlet pipe of the multi-way switching valve I is an inlet for the high temperature and high pressure medium.

A multi-way switching valve II is provided, which is a five-way valve. the multi-way switching valve II includes an outlet pipe and four inlet pipes located above the outlet pipe and circumferentially distributed, a switching valve element II for controlling the opening and closing of the multi-way switching valve II is mounted on a side of each of the multiple inlet pipes of the multi-way switching valve II, and the four switching valve elements II are respectively used for the switching of the four valve sets.

A bottom end of each outlet pipe of the multi-way switching valve I is respectively connected to a top end of the corresponding inlet pipe of the multi-way switching valve II through one regulating valve set. The four regulating valve sets are identical, and each of the regulating valve sets includes an upstream second shutoff valve 3 (angle stop valve), a depressurization regulating valve 4, and a downstream second shutoff valve 5 (ball valve) which are sequentially arranged. Each of the outlet pipes of the multi-way switching valve I is connected with an inlet of the angle stop valve is by one connecting pipeline. So do an outlet of the angle stop valve and an inlet of the depressurization regulating valve, an outlet of the depressurization regulating valve and an inlet of the ball valve, and an outlet of the ball valve and each of the inlet pipes of the multi-way switching valve II.

The integrated depressurizing system mounted in a circumferentially distributed manner further includes the mechanical control system (not shown)and the intelligent control system (not shown), where the mechanical control system for controlling the opening and closing of each valve is provided at each valve, and the intelligent control system is configured to control the operation of the mechanical control system.

The overall circumferential distribution solution of each main process pipeline can minimize the pipeline stress. As shown in FIG. 4-2 (in the following description, a position close to the multi-way switching valve I is defined as the front, a position close to the multi-way switching valve II is defined as the rear, an upper position is defined as the top, and a lower position is defined as the bottom), the specific design solution thereof is as follows. A straight line formed between the inlet pipe of the multi-way switching valve I and the outlet pipe of the multi-way switching valve II is taken as an axis, and the four regulating valve sets are circumferentially distributed around the axis. The angle stop valve and the ball valve are horizontally mounted, and the depressurization regulating valve is vertically mounted. Each of the outlet pipes of the multi-way switching valve I and a side inlet of the angle stop valve are connected through an L-shaped connecting pipeline II32 vertically provided, a rear end outlet of the angle stop valve and a side inlet of the depressurization regulating valve are connected through a horizontal tubular connecting pipeline III33 horizontally provided, a bottom end outlet of the depressurization regulating valve and a front end inlet of the ball valve are connected through an L-shaped connecting pipeline IV34 vertically provided, and a rear end outlet of the ball valve and each of the inlet pipes of the multi-way switching valve II are connected through an L-shaped connecting pipeline V35 vertically provided. The main bodies of the angle stop valve and the depressurization regulating valve of each regulating valve set are located on an upper layer, and the ball valve is located on a lower layer. This layered arrangement allows the space arrangement to be more reasonable.

The operation process of the present embodiment is as follows: the medium with high temperature and high pressure enters the depressurizing system through the inlet pipe of the multi-way switching valve I, and selectively flows into one or more of the four regulating valve sets 4 through the switching valve element I2, and after being depressurized by the regulating valve set 4, the medium is converged by the switching valve element II (downstream first shutoff valve 7) at the outlet pipe 6 of the multi-way switching valve II, and finally flows out.

The integrated depressurizing system mounted in the circumferentially distributed manner according to the present embodiment can meet the pressure-regulation requirements under high temperature and high pressure differential working conditions, can reduce the thermal stress during the use of the device, can reduce the risk of valve-cracking and valve-sticking to some extent, and can greatly prolong the operating cycle service life of the process device.

Third Embodiment

Different from the second embodiment, as shown in FIG. 4-3 (in the following description, a position close to the multi-way switching valve I is defined as the front, a position close to the multi-way switching valve II is defined as the rear, an upper position is defined as the top, and a lower position is defined as the bottom), the specific design of the depressurizing system mounted in a circumferentially distributed manner is as follows. A straight line formed between the inlet pipe of the multi-way switching valve I and the outlet pipe of the multi-way switching valve II is taken as an axis, and the four regulating valve sets are circumferentially distributed around the axis. The angle stop valve, the depressurization regulating valve and the ball valve are horizontally mounted. Each of the outlet pipes of the multi-way switching valve I is connected with a side inlet of the angle stop valve through an L-shaped connecting pipeline II32 vertically provided, a rear end outlet of the angle stop valve is connected with a side inlet of the depressurization regulating valve through an L-shaped connecting pipeline III33 vertically provided, a rear end outlet of the depressurization regulating valve is connected with a front end inlet of the ball valve through a horizontal tubular connecting pipeline IV34 horizontally provided, and a rear end outlet of the ball valve is connected with each of the inlet pipes of the multi-way switching valve II through an L-shaped connecting pipeline V35 vertically provided. The angle stop valve of each regulating valve set is located on an upper layer, and the main bodies of the depressurization regulating valve and the ball valve are located on a lower layer (and a same layer). This layered arrangement allows the space arrangement to be more reasonable.

Fourth Embodiment

Different from the second embodiment, as shown in FIG. 4-4 (in the following description, a position close to the multi-way switching valve I is defined as the front, a position close to the multi-way switching valve II is defined as the rear, an upper position is defined as the top, and a lower position is defined as the bottom), the specific design of the depressurizing system mounted in a circumferentially distributed manner is as follows. A straight line formed between the inlet pipe of the multi-way switching valve I and the outlet pipe of the multi-way switching valve II is taken as an axis, and the four regulating valve sets are circumferentially distributed around the axis. The angle stop valve, the depressurization regulating valve and the ball valve are horizontally mounted. Each of the outlet pipes of the multi-way switching valve I is connected with a side inlet of the angle stop valve through an L-shaped connecting pipeline II32 vertically provided, a rear end outlet of the angle stop valve is connected with a side inlet of the depressurization regulating valve through an L-shaped connecting pipeline III33 vertically provided, a rear end outlet of the depressurization regulating valve is connected with a front end inlet of the ball valve through an L-shaped connecting pipeline IV34 horizontally provided (the rear end outlet of the depressurization regulating valve is consistent with and is in parallel with the main body of the ball valve), and a rear end outlet of the ball valve is connected with each of the inlet pipes of the multi-way switching valve II through an L-shaped connecting pipeline V35 vertically provided. The angle stop valve of each regulating valve set is located on an upper layer, and the main bodies of the depressurization regulating valve and the ball valve are located on a lower layer (and a same layer). This layered arrangement allows the space arrangement to be more reasonable.

Fifth Embodiment

Different from the first to the fourth embodiments, the multi-way switching valve I and the multi-way switching valve II are both four-way valves or six-way valves or seven-way valves or eight-way valves, that is, the number of the outlet pipes 13 of the multi-way switching valve I is three or five or six or seven, which are circumferentially distributed below the inlet pipe of the multi-way switching valve I, the number of the inlet pipes of the multi-way switching valve II is the same as the number of the outlet pipes of the multi-way switching valve I, and the inlets pipes of the multi-way switching valve II are circumferentially distributed above the outlet pipe 6 of the multi-way switching valve II.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application.

The undetailed part of the present application belongs to the well-known technology to those skilled in the art.

The invention claimed is:

1. A skid-mounted depressurizing system, comprising a main process module, a mechanical control system, a thermodynamic balance system and a control system, wherein the main process module comprises a plurality of main process pipelines, each of the plurality of the main process pipelines is provided with a pressure reducing valve set;

the thermodynamic balance system comprises a storage unit, a switching unit, a heating unit, a cooling unit, and a conveying unit, the storage unit is configured to store the medium, the heating unit is configured to heat the input medium, and the cooling unit is configured to cool the input medium, the conveying unit is configured to increase pressure of the medium flowing out of the storage unit and convey the medium downstream, and the switching unit is configured to output the heated or cooled medium during operation, the mechanical control system comprises at least one of an electric control system, a pneumatic control system, or an electro-hydraulic control system, and the control system comprises a central control module, a depressurizing-system external signal processor, a mechanical-control-system processing module, and a thermodynamic-balance-system processing module, wherein the depressurizing-system external signal processor is configured to receive and process signals of upstream and downstream devices or other signals external to the depressurizing system, and transmit the signals to the central control module for corresponding processing, the mechanical-control-system processing module is configured to receive an instruction sent by the central control module, and to feedback and control each valve in the main process module to implement actions; and the thermodynamic-balance-system processing module is configured to receive the instruction sent by the central control module, and to feedback and control actions of each functional unit in the thermodynamic balance system;

a process medium is configured to enter at least one of the plurality of the main process pipelines during depressurization, the control system is configured to send control instructions to the mechanical control system and the thermodynamic balance system, the mechanical control system is configured to output a torque according to the control instructions of the control system to control opening and closing and opening degree adjustment of each valve of the plurality of the main process pipelines, and the thermodynamic balance system is configured to provide the medium of different properties to the plurality of the main process pipelines according to the control instructions of the control system to control temperature, pressure, cleanliness degree or sealing degree of the main process module;

the main process module comprises N main process pipelines, N≥4, and the N main process pipelines are backup pipelines for each other;

inlets of the plurality of the main process pipelines are connected together by one pipe, and outlets of the plurality of the main process pipelines are connected by another pipe, or the inlets of the plurality of the main process pipelines are connected by a multi-way switching valve, and the outlets of the plurality of the main process pipelines are connected by another multi-way switching valve;

the inlets of the N main process pipelines are connected by a multi-way switching valve I, and the outlets are connected by a multi-way switching valve II and are circumferentially distributed;

the multi-way switching valve I comprises an inlet pipe and plurality of outlet pipes located below the inlet pipe and circumferentially distributed, a switching valve element I configured to control the opening and closing of the multi-way switching valve is mounted on a side of each of the plurality of the outlet pipe of the multi-way switching valve I, and a top end of the inlet pipe of the multi-way switching valve I is an inlet for the medium;

the multi-way switching valve II comprises an outlet pipe and a plurality of inlet pipes located above the outlet pipe of the multi-way switching valve II and circumferentially distributed, a switching valve element II configured to control the opening and closing of the multi-way switching valve is mounted on a side of each of the plurality of the inlet pipes of the multi-way switching valve II, and a bottom end of each outlet pipe of the multi-way switching valve I is respectively connected to a top end of the corresponding inlet pipe of the multi-way switching valve II through one of the main process pipelines; and the medium is configured to enter from the inlet pipe of the multi-way switching valve I, then selectively flow into one or more of the N main process pipelines according to the opening and closing of the switching valve element I, then be converged at the outlet pipe of the multi-way switching valve II by the switching valve element II after depressurization, and finally flow out.

2. The skid-mounted depressurizing system according to claim 1, wherein the multi-way switching valve I is at least one of a three-way valve, a four-way valve, a five-way valve, a six-way valve, a seven-way valve, and an eight-way valve; and the number of the outlet pipes of the multi-way switching valve I is equal to the number of the inlet pipes of the multi-way switching valve II.

3. The skid-mounted depressurizing system according to claim 1, wherein the pressure reducing valve set comprises a depressurization regulating valve, a shutoff valve ahead of the depressurization regulating valve, and a shutoff valve behind the depressurization regulating valve, which are sequentially arranged; each of the outlet pipes of the multi-way switching valve I and an inlet of the shutoff valve ahead of the depressurization regulating valve are connected by one connecting pipeline; an outlet of the shutoff valve ahead of the depressurization regulating valve and an inlet of the depressurization regulating valve are connected by one connecting pipeline; an outlet of the depressurization regulating valve and an inlet of the shutoff valve behind the depressurization regulating valve are connected by one connecting pipeline; and an outlet of the shutoff valve behind the depressurization regulating valve and each of the inlet pipes of the multi-way switching valve II are connected by one connecting pipeline.

4. The skid-mounted depressurizing system according to claim 3, wherein the shutoff valve ahead of the depressurization regulating valve is embodied as an angle stop valve, the shutoff valve behind the depressurization regulating valve is embodied as a ball valve, the angle stop valve and the ball valve are horizontally mounted, and the depressurization regulating valve is vertically mounted; and each of the outlet pipes of the multi-way switching valve I and a side inlet of the angle stop valve are connected through an L-shaped connecting pipeline I vertically provided, a rear end outlet of the angle stop valve and a side inlet of the depressurization regulating valve are connected through a horizontal tubular connecting pipeline II horizontally provided, a bottom end outlet of the depressurization regulating valve and a front end inlet of the ball valve are connected through an L-shaped connecting pipeline III vertically provided, and a rear end outlet of the ball valve and each of the inlet pipes of the multi-way switching valve II are connected through an L-shaped connecting pipeline IV vertically provided.

5. The skid-mounted depressurizing system according to claim 3, wherein:
the shutoff valve ahead of the depressurization regulating valve is an angle stop valve, the shutoff valve behind the depressurization regulating valve is a ball valve, and the angle stop valve, the depressurization regulating valve, the ball valve are all horizontally mounted; and
each of the outlet pipes of the multi-way switching valve I and a side inlet of the angle stop valve are connected through an L-shaped connecting pipeline I vertically provided, a rear end outlet of the angle stop valve and a side inlet of the depressurization regulating valve are connected through an L-shaped connecting pipeline II vertically provided, a rear end outlet of the depressurization regulating valve and a front end inlet of the ball valve are connected through a horizontal tubular connecting pipeline III horizontally provided, and a rear end outlet of the ball valve and each of the inlet pipes of the multi-way switching valve II are connected through an L-shaped connecting pipeline IV vertically provided.

6. The skid-mounted depressurizing system according to claim 3, wherein
the shutoff valve ahead of the depressurization regulating valve is an angle stop valve, the shutoff valve behind the depressurization regulating valve is a ball valve, and the angle stop valve, the depressurization regulating valve, and the ball valve are all horizontally mounted; and
each of the outlet pipes of the multi-way switching valve I and a side inlet of the angle stop valve are connected through an L-shaped connecting pipeline I vertically provided, a rear end outlet of the angle stop valve and a side inlet of the depressurization regulating valve are connected through an L-shaped connecting pipeline II vertically provided, a rear end outlet of the depressurization regulating valve and a front end inlet of the ball valve are connected through an L-shaped connecting pipeline III horizontally provided, and a rear end outlet of the ball valve and each of the inlet pipes of the multi-way switching valve II are connected through an L-shaped connecting pipeline IV vertically provided.

7. The skid-mounted depressurizing system according to claim 1, wherein the switching unit comprises a cooling pipeline and a heating pipeline connected in parallel, and the cooling unit is provided on the cooling pipeline, the heating unit is provided on the heating pipeline, and one end of the switching unit is connected to the conveying unit, and another end of the switching unit is an output port.

8. The skid-mounted depressurizing system according to claim 7, wherein the cooling pipeline is provided with a valve I and a valve IV respectively located on two sides of the cooling unit, the heating pipeline is provided with a valve II and a valve III respectively located on two sides of the heating unit, a first end of the cooling pipeline and a first end of the heating pipeline are connected to the conveying unit through a first connecting pipeline, the first connecting pipeline is provided with a minimum return valve, a second end of the cooling pipeline and a second end of the heating pipeline are connected through a second connecting pipeline, and a valve V is provided on the second connecting pipeline.

9. The skid-mounted depressurizing system according to claim 1, wherein
the electric control system comprises an electric actuator and an electric control unit configured to control the electric actuator, and the electric control unit is a local electric control unit or a remote electric control unit;
the pneumatic control system comprises a pneumatic actuator, an emergency unit, a gas supply system and a pneumatic control unit, the pneumatic actuator is a pneumatic diaphragm or a cylinder actuator, the emergency unit is an emergency airbag or an emergency gas cylinder, and the pneumatic control unit is a local pneumatic control unit or a remote pneumatic control unit; and
the electro-hydraulic control system comprises an electro-hydraulic actuator, an oil supply system and an electro-hydraulic control unit, and the electro-hydraulic control unit is a local electro-hydraulic control unit or a remote electro-hydraulic control unit.

10. The skid-mounted depressurizing system according to claim 1, wherein the different properties comprise different pressure, different temperature or different kinds.

* * * * *